US010198818B2

(12) United States Patent
Varadarajan et al.

(10) Patent No.: US 10,198,818 B2
(45) Date of Patent: Feb. 5, 2019

(54) COMPLEXITY REDUCTION OF HUMAN INTERACTED OBJECT RECOGNITION

(71) Applicant: INTEL CORPORATION, Santa Clara, CA (US)

(72) Inventors: Srenivas Varadarajan, Bangalore (IN); Praveen Gopalakrishnan, Hillsboro, OR (US); Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/291,507

(22) Filed: Oct. 12, 2016

(65) Prior Publication Data

US 2018/0101955 A1 Apr. 12, 2018

(51) Int. Cl.
*G06K 9/00* (2006.01)
*G06T 7/00* (2017.01)

(52) U.S. Cl.
CPC .......... *G06T 7/0042* (2013.01); *G06T 7/0081* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 2003/0099375 A1* | 5/2003 | Sefcik | .............. | G06T 7/20 382/103 |
| 2005/0090957 A1* | 4/2005 | Luo | .............. | B60R 21/01538 701/45 |
| 2007/0230742 A1 | 10/2007 | Burns et al. | | |
| 2010/0067803 A1 | 3/2010 | Huang et al. | | |
| 2010/0293106 A1* | 11/2010 | Rhoads | .............. | G06Q 10/083 705/330 |
| 2010/0295868 A1* | 11/2010 | Zahnert | .............. | H04N 1/107 345/634 |
| 2013/0227603 A1 | 8/2013 | Bosworth et al. | | |
| 2014/0003661 A1* | 1/2014 | Kwon | .............. | H04N 5/23293 382/103 |
| 2014/0169627 A1 | 6/2014 | Gupta | | |
| 2016/0275686 A1 | 9/2016 | Zach | | |

OTHER PUBLICATIONS

PCT International Search Report, PCT Application No. PCT/US2017/050635, dated Dec. 14, 2017, 3 pages.
Ryoo et al., "Hierarchical Recognition of Human Activities Interacting with Objects," Computer & Vision Research Center, IEEE, 8 pages, USA.
Sokeh et al., "Determining Interacting Objects in Human-Centric Activities via Qualitative Spatio-Temporal Reasoning," ACCV2014, 15 pages, Australia.
Varadarajan et al., "A Real-time System for Shoppers' Action Recognition," Society for Imaging and Technology, 2016, 6 pages, USA.
Wang et al., "An Approach to Pose-Based Action Recognition," CVPR 2013, pp. 915-922, USA.
Wei et al., "Modeling 4D Human-Object Interactions for Event and Object Recognition" ICCV 2013 Sydney, Austrialia, 8 pages.

\* cited by examiner

*Primary Examiner* — Stephen P Coleman
(74) *Attorney, Agent, or Firm* — International IP Law Group, P.L.L.C.

(57) ABSTRACT

In one example, a system for recognizing an object includes a processor to select from a plurality of image frames an image frame in which a view of the object is not blocked, and to estimate a location of the object in the selected image frame.

32 Claims, 8 Drawing Sheets

COMPLEXITY REDUCTION OF HUMAN INTERACTED OBJECT RECOGNITION

TECHNICAL FIELD

This disclosure relates generally to spatio-temporal complexity reduction of Human Interacted Object (HIO) recognition using human action and pose contexts.

BACKGROUND

Known implementations of human interacted object recognition are complex. It would be beneficial to reduce the complexity of human interacted object detection in order to reduce processing and/or network transmission bandwidth requirements.

BRIEF DESCRIPTION OF THE DRAWINGS

The following detailed description may be better understood by referencing the accompanying drawings, which contain specific examples of numerous features of the disclosed subject matter.

FIG. 3, which includes FIG. 3(a), FIG. 3(b), and FIG. 3(c), illustrates human object interactions in a shopping environment;

FIG. 6, which includes

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to one or more of computer vision, action recognition, human object Interaction, and/or object recognition.

Some embodiments relate to spatio-temporal complexity reduction of human interacted object (HIO) recognition using human action and pose contexts.

Some embodiments relate to improving compute efficiency and accuracy for object recognition in smart activity spaces using human action and pose contexts.

In some embodiments, Human Interaction Object (HIO) recognition utilizes a person's actions in order to localize objects with which a person is interacting. This localization can include both localization in time as well as localization in a spatial domain. Localization in time can include, for example, identifying a correct image frame in a video sequence which is to be used to locate an object with which a person is interacting (for example, either a frame before or after the person picks up the object). Localization in the spatial domain can relate to a particular region in an image frame and/or which particular pixels of the image frame (for example, a set of adjacent pixels) in an image frame relate to the location of the object with which the person is interacting.

In a work environment like a hospital, a manufacturing unit or a kitchen, there are an expected set of activities. Many of these activities involve Human Object Interactions (HOIs), in which a set of tools or objects are picked up one after another from a common storage area, and a sequence of steps are performed with them.

For example:

In a hospital's operating room, a surgeon may pick different surgical tools, chemicals and instruments one after another for performing a specific surgical procedure.

In a kitchen, making a particular dish may call for taking a specific set of ingredients one after another and performing a set of steps like chopping, mixing, and frying them.

In a manufacturing workplace, a set of tools like a hammer or a screw-driver may be borrowed by workers from a common area for a specific task and put back after use.

In a store, a shopper may pick up different items from a store shelf for potential purchase.

In all these cases, recognizing the human interacted object can help in the following:

If an object fetched is different from that expected for performing a particular task, then the operator can be alerted for taking corrective measures.

For actions involving minor limb movements that would otherwise be difficult to distinguish, the objects can help in deciphering the actions. For example, drawing blood sample Vs measuring blood pressure (BP) in a hospital room can be inferred by recognizing objects such as the syringe or the BP meter.

If an object is misplaced, then an early warning can save time for another person interested in the misplaced object.

Shopping activities, purchases, interests, etc. can be identified for later use.

Desirable attributes of solutions in these scenarios are to perform object recognition accurately, timely (often in real time or near real time), and cost effectively. With the increased adoption of 3D sensors like Intel® RealSense and Microsoft® Kinect, for example, smart activity spaces will become more and more embedded with such sensors.

If object recognition is performed on every pixel and every frame of the video streamed from the smart activity scene, accurate object recognition is highly compute intensive and might require special hardware (for example, graphics processing units or GPUs) if the recognition is to be done in real time. As a result, such an approach would require tradeoffs between accuracy, time to result, and cost.

Some embodiments relate to a novel approach to reducing the spatio-temporal complexity of object recognition such that the solution becomes accurate, timely and cost effective. In some embodiments, human pose context is used to select a small subset of frames (reducing temporal complexity) and within them selecting a subset of regions where the probability of finding the human interacted object is the highest.

In some embodiments, the skeletal joints (human pose) can be tracked through a 3D Camera such as Microsoft® Kinect or Intel® Real Sense, and the 2D and 3D locations of the human joints are able to be known at every frame of the video sequence.

In some embodiments, key objects that need to be recognized for many smart activity space applications involve human interaction. As such, according to some embodiments, human object interactions are exploited in order to do more efficient and accurate object recognition Some embodiments relate to localizing interactions over a set of video-frames, enabling the vision system to select the most probable set of frames over which the object is un-occluded, and therefore suitable for recognizing the object. This achieves temporal localization of the object. As used herein, according to some embodiments, un-occluded relates to a situation where an object is not visible from a line of sight of a camera, and is blocked, for example, by a body part of a person (for example, the hands of a person examining the object).

Some embodiments relate to using 2D location of the wrist in the frame at which the human touched the object. This gives an approximate localization for the object's location within the frame.

In some embodiments, due to the removal or placement of the object, there is a change in values of the pixels covering the object. This change detection helps in refining the earlier obtained approximate localization in order to form a more accurate bounding box.

In some embodiments, action and pose contexts help in localizing the interacted object in both space and time, and as a result hasten the speed and accuracy of object recognition.

Figure 1:
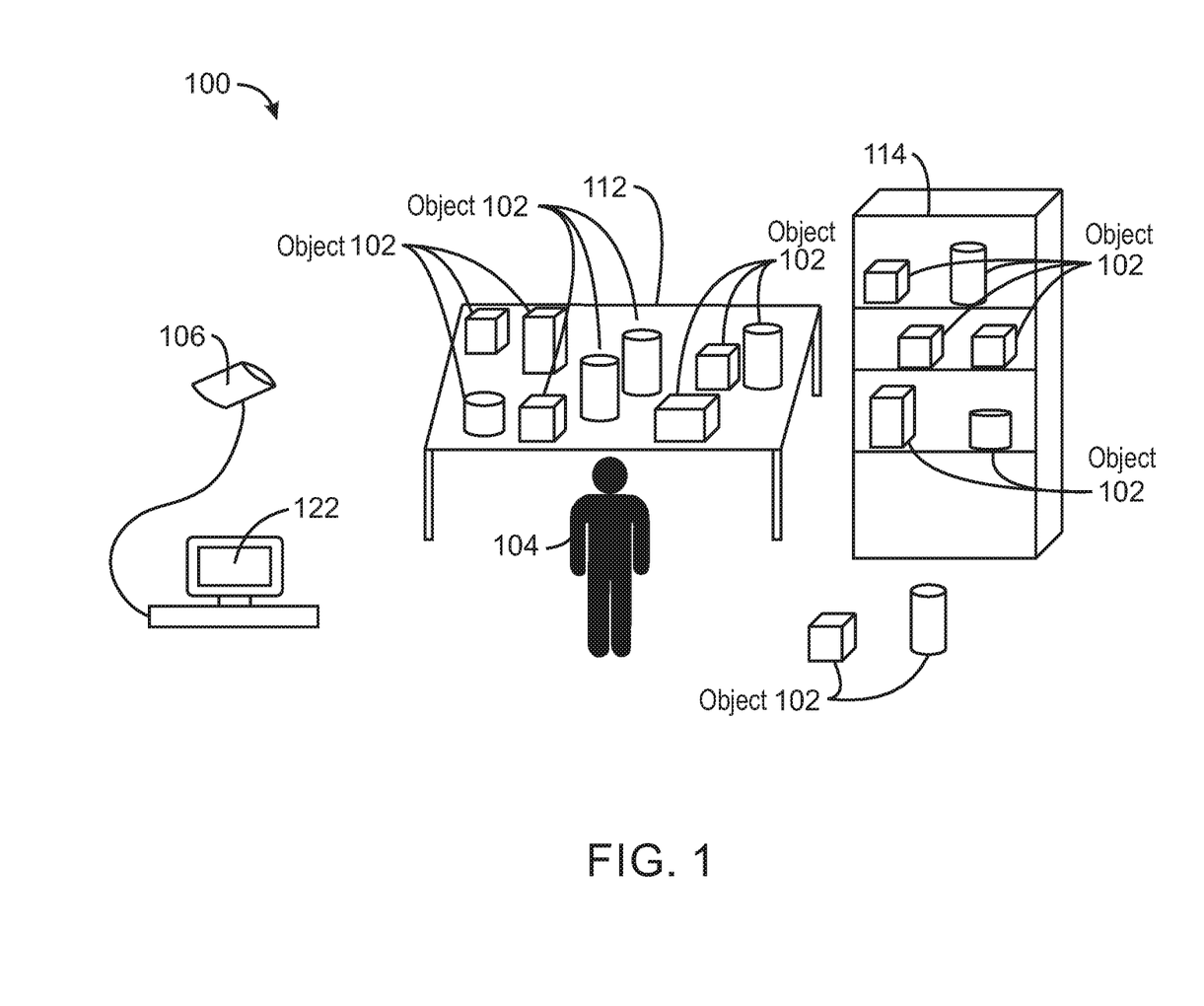
FIG. 1 illustrates a smart activity workspace system.

FIG. 1 illustrates a generic smart activity workspace 100. In some embodiments, FIG. 1 illustrates a smart activity workspace 100 including one or more objects 102, one or more humans 104, and a 3D camera 106 looking into a scene of the workspace 100. The workspace 100 of FIG. 1 could be, for example, a hospital operation room, a kitchen, a manufacturing unit, a store shopping environment, or some other workspace. The workspace 100 includes a number of objects (and/or tools) 102 needed to perform a set of tasks. The objects and/or tools 102 are placed in various regions of the workspace 100 such as a table 112, a shelf 114, or on the floor of the workspace 100, for example. The human operator 104 fetches the objects 102 (for example, one after the other in a specific order) and performs a sequence of tasks and puts the objects 102 back after use. In some embodiments, the scene of workspace 100 is viewed using a passive 3D camera 106 (for example, Kinect or Real Sense camera) which includes support for multi-person, multi-view pose-tracking in hardware, firmware, software, and/or some combination thereof. The camera 106 is connected to a computing device 122 which executes view-invariant action recognition as well as detecting human interacted objects (HIOs). View-invariant action recognition could include, for example, that described in an article entitled "Real-time system for shopper's action recognition", by S. Varadarajan and S. Shahrokh, Electronic Imaging Conference on Video Surveillance and Transportation Imaging Applications", 2016.

Figure 2:
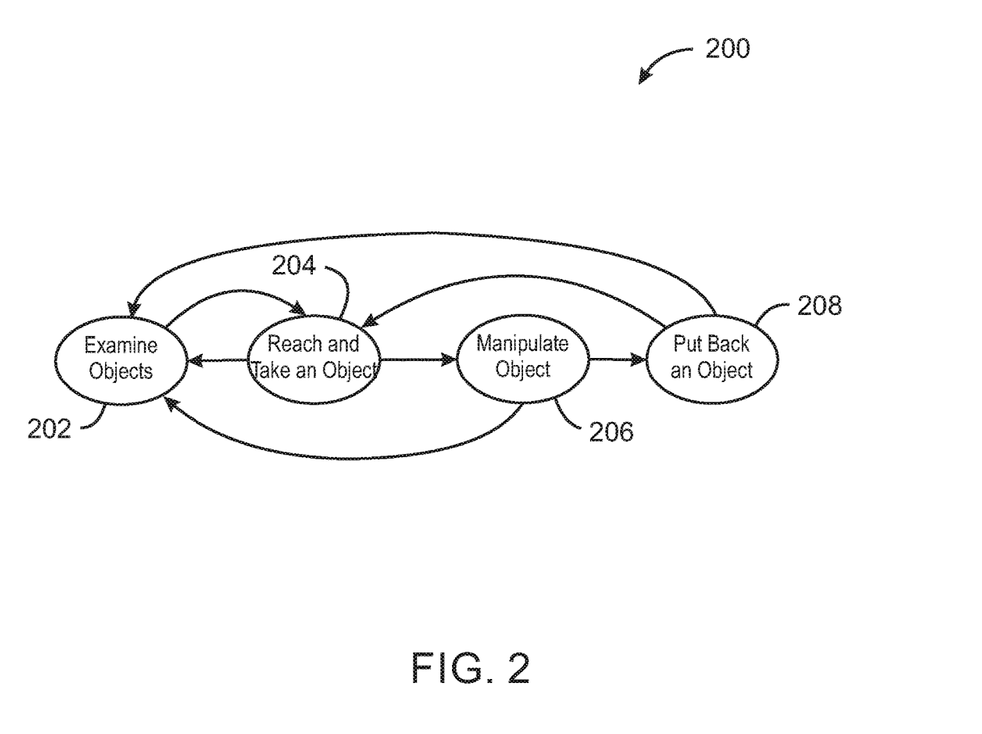
FIG. 2 illustrates a state diagram of high level human object interactions.

FIG. 2 illustrates state transitions 200 of high level human object interactions. For example, in some embodiments, FIG. 2 illustrates a four state machine 200 in which high level human object interactions perform a task. In some embodiments, the objects being interacted with could be objects and/or tools, for example, such as one or more objects and/or tools of the objects and/or tools 102 illustrated in FIG. 1. The actions illustrated in FIG. 2 include examining a set of objects at 202, reaching out and fetching an object at 204, manipulating the fetched object at 206 and putting back the object at 208 (for example, onto a shelf or a table). These actions indicate the "objects of interest" which are worth recognizing and also help in selecting certain target image frames for detecting them. These actions can be reliably recognized through an action-recognition (AR) process such as, for example, the one described in the "Real-time system for shopper's action recognition" by P. Wei, Y. Zhao, N. Zheng and S-C Chu, Electronic Imaging Conference on Video Surveillance and Transportation Imaging Applications, 2016. The action label along with the 2D pose data (for example, locations of human joints in a video frame) can be used to localize the spatial positioning of the object in the target frame.

Figures 3, 3B:
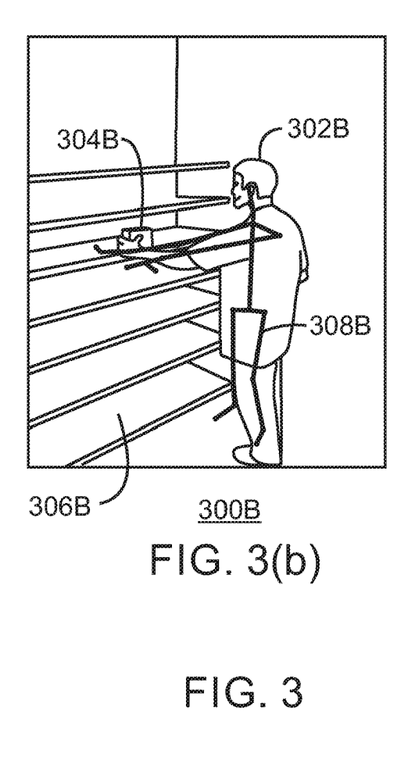
Figure 3A:
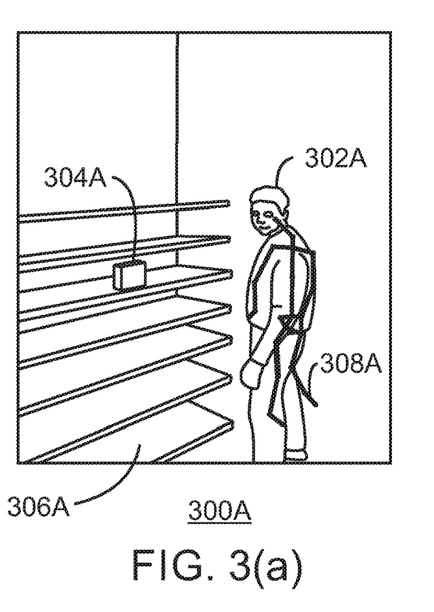
Figure 3C:
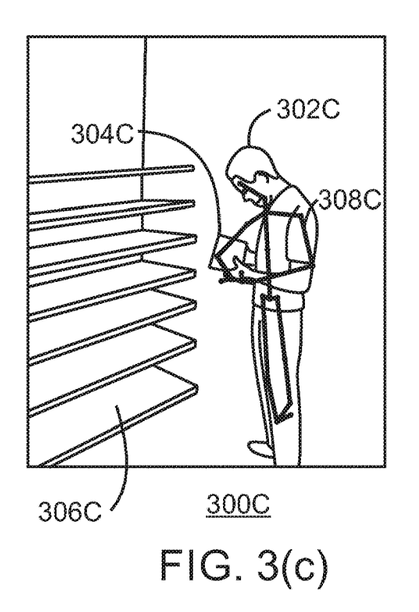

FIG. 3, which includes FIG. 3(a), FIG. 3(b), and FIG. 3(c), illustrates examples 300A, 300B and 300C of Human Object Interactions (HOIs) in a shopping activity environment. FIG. 3(a) illustrates a shopper 302A examining an object (for example, one or more objects 304A on one or more shelf 306A), FIG. 3 (b) illustrates a shopper 302B reaching out for an object 304B (for example, on one or more shelf 306B), and FIG. 3(c) illustrates a shopper 302C manipulating an object 304C (for example, reading a product label of an object 304C that the shopper 302C has removed from a shelf 306C). Although only one object is shown in each of FIGS. 3(a), 3(b) and 3(c), it is noted that there are likely many other objects also on the shelves that are not illustrated. The skeletal lines and joints 308A, 308B, and 308C, obtained from a camera (for example, a Kinect camera and/or a camera such as camera 106 in FIG. 1) are overlaid on the shoppers 302A, 302B, and 302C in FIG. 3(a), 3(b), and FIG. 3(c), respectively.

FIG. 3 illustrates a shopping activity in which a shopper 302A, 302B, 302C stands in front of a retail shelf 306A, 306B, 306C, and picks products 304A, 304B, 304C, for example, one after the other. Recognizing the objects picked by the shopper can aid in an automated shelf-checkout. Some of the high level interactions and their potential implications are illustrated through FIG. 3. For example, while examining a shelf 306A as shown in FIG. 3(a), all objects on the shelf (including unillustrated objects on the shelves 306A including object 304A on one of the shelves 306A) are un-occluded in the image frame. That is, all objects on shelves 306A (including object 304A) are not blocked (or occluded) by any body part of the shopper, and hence this image frame is suitable for object recognition. In FIG. 3(b) and FIG. 3(c), on the other hand, at least some of the objects on the shelves 306B and 306C or picked up from those shelves by a user (both unillustrated objects on the shelves 306B and 306C as well as objects 304B and 304C) are blocked (or occluded) by at least some body part of the user. In FIG. 3(b), the 2D joint position of the shopper's fingers while touching the object 304B helps in the spatial localization of the object 304B in the target frame. While reading a product label of the object 304C (and/or while manipulating the object 304C) as shown in FIG. 3(c), the object 304C under consideration is occluded by the hands of the shopper 302C, but the rest of the objects (for example, on the shelf 306C but not illustrated in FIG. 3) are un-occluded. In image frame 300C, the hands of the shopper are blocking the line of sight between the camera and the object 304C. This frame can be used as a target frame for recognizing products fetched in future frames by the shopper 302A, 302B, 302C. A similar set of action states will exist in any activity like cooking, grooming or a surgery in which the objects and/or tools exist in a scene and they are picked, manipulated and released sequentially. Although FIGS. 3(a), 3(b), and 3(c) are illustrated with a shopper reviewing objects such as shopping objects on a shelf that the shopper might purchase, it is noted that in some embodiments the objects might be other types of objects/tools from any type of arrangement (for example, on a table or a floor or other location) for a human to view, handle, manipulate, use, etc.

Figure 4:
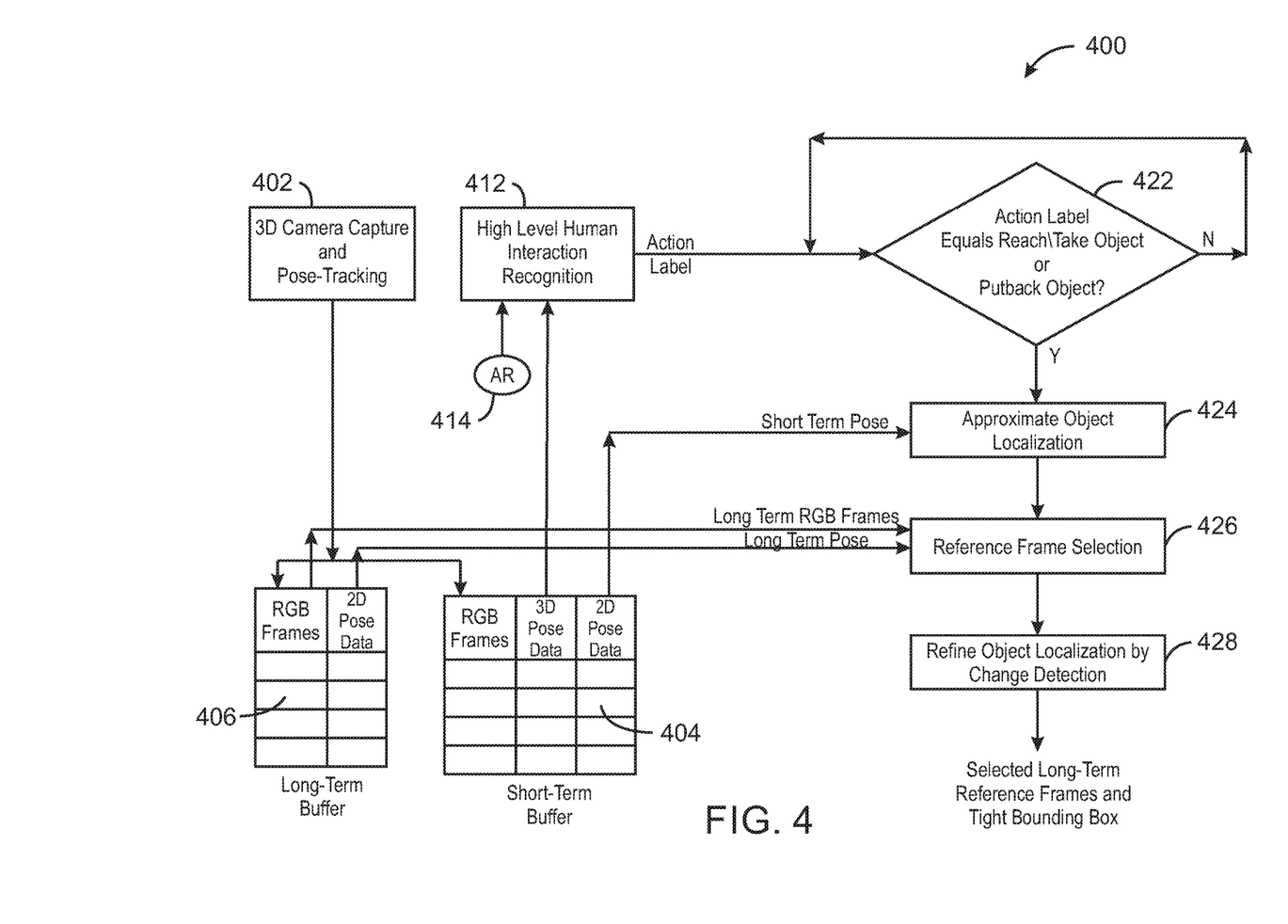
FIG. 4 illustrates spatio-temporal localization of a human interacted object.

FIG. 4 illustrates spatio-temporal localization of a human interacted object (HIO). In some embodiments, FIG. 4 illustrates a process flow method for spatio-temporal localization of a human interacted object in a video sequence (for example, as illustrated in a diagram 400 in FIG. 4).

In some embodiments, a 3D Depth-camera (for example, a camera such as Microsoft® Kinect or Intel® Real Sense cameras) which has a built-in pose-tracking feature, captures RGB frames along with the corresponding pose-data at block 402. In some embodiments the pose tracking implemented in box 402 can be implemented within the camera itself, such as camera hardware, software, and/or firmware (for example, within camera 106 of FIG. 1, within a Microsoft® Kinect box, and/or within an Intel® Real Sense camera). The RGB frames and corresponding pose data are stored in a short-term buffer 404 (for example, a short term circular buffer). Short-term buffer 404 stores RGB frames, three dimensional (3D) pose data, and two-dimensional (2D) pose data, for example. In some embodiments, the capture rate for the short term buffer 404 is 20 fps (frames per second). Once in a while (for example, every 5 seconds), an RGB frame is also captured into a long-term buffer 406 (for example, a long-term circular buffer), and these frames serve as target frames for object recognition. Although the long-term buffer 406 illustrates RGB frames and 2D pose data being stored therein, it is noted that 3D pose data can also be stored in long-term buffer 406. In some embodiments, the pose-data from the short-term buffer 404 can be used to recognize one of the high level action states mentioned in FIG. 2.

High level human interaction recognition is performed at box 412. In some embodiments, high level human interaction recognition is performed at box 412 in response to action recognition (AR) 414. In some embodiments, the high level human interaction recognition is performed within a computer that is connected to the camera (for example, within computing device 122 of FIG. 1). Pose is very important in determining human interaction recognition (for example, as performed at box 412). In some embodiments, action is modeled as a sequence of human poses, and human interaction recognition 412 uses Hidden Markov Models (HMMs) to use human poses to recognize actions. Poses stored in the long term buffer 406 and in the short term buffer 404 are used to help implement human interaction recognition at box 412. Poses from long term buffer 406 and/or from short term buffer 404 are additionally used for object localization and/or for reference frame selection.

In some embodiments, human-object interactions like "reaching for an object" and "taking an object" can be recognized by a pose-based action-recognition approach, and the action label is known at every frame. In some embodiments, action recognition 414 and human interaction recognition 412 are performed in a manner where joint tracking may be used from video image frames or still images. The pose may be represented through relative displacements of discriminative body joints for considered actions. For example, displacements of wrist and/or elbow joints from the hip may be used to detect interactions of a user with objects and/or tools. In order to account for actions of an active hand of the user and to form a pose representation that is agnostic to the location of the inactive hand, for example, the maximum displacements of the wrist and elbow joints may be used. A pose in an incoming image frame may be mapped onto an example pose in a pose dictionary using nearest neighbor mapping. Different pose dictionaries may be used depending on the particular location or type of activity. For example, a pose dictionary for a manufacturing location, a hospital, a kitchen, or a retail location may all be different from each other.

At box 422 a determination is made as to whether an action is occurring in an image frame associated with a user either reaching for and/or taking an object or putting an object back after taking an object, manipulating that object, etc. Once it is determined at 422 that the action occurring is a reaching/taking of an object or a putting back of an object, approximate object localization occurs at box 424.

Some embodiments include approximate object localization such as that occurring at box 424. The hand of a person that is used for picking an object is considered the "active hand". If both hands are used, then either hand can be considered as the "active hand". In some embodiments, the active hand of a user is found in each frame by measuring the amount of horizontal 3D displacement of one or both of the two wrists of that user from the hip joint of the user using the 3D pose data and choosing the maximum. In some embodiments, it is assumed that during the process of reaching and taking an object, the contact with the object happens at an image frame (for example, image frame $F_{max\_disp}$) at which the wrist of the active hand is at a maximum displacement from the hip. It is natural for humans to move their hands only to the extent that is needed to complete a task ("picking an object" in this case). The 2D joint location of the wrist at the $F_{max\_disp}$ image frame, gives an approximate location of the object, $A_{loc}$. An Approximate Bounding Box (ABB) (for example, of size a by a) is constructed around $A_{loc}$ in the $F_{max\_disp}$ image frame. In some embodiments, it is assumed that all interacted objects for a given depth range and resolution of the camera are smaller than a×a pixels. This achieves spatial localization of the object. In some embodiments, box 424 uses pose data such as, for example, 2D pose data from short-term buffer 404. However, 3D pose data and/or pose data from the long-term buffer 406 could be used to achieve approximate object localization according to some embodiments (either instead of or in addition to the short term 2D pose data).

Some embodiments include reference frame selection (for example, at reference frame selection block 426 of FIG. 4). Since the hands of a user will be partially occluding (or blocking) the line of sight of the camera to the object while touching it, a particular image frame (for example, $F_{max\_disp}$) may not be a suitable frame for object recognition. In order to perform interacted object detection and recognition on a frame, the Approximate Bounding Box (ABB) region has to be un-occluded (unblocked) by human body parts in the considered image frame. Such frames can be selected from the long-term RGB frames from long-term buffer 406 (that is, for example, long-term RGB frames in which ABB does not intersect the human body silhouette). The human body silhouette in each frame can be inferred using foreground extraction or silhouette synthesis around the 2D skeletal joints. In some embodiments, the long term RGB and pose buffers are captured in long-term buffer 406 at certain times. Based on the non-intersection of the ABB with the human body silhouette in these image frames, some frames are qualified as "un-occluded frames" (or unblocked frames). For every "take object" or "put back object" action, one (or more) past and one (or more) future un-occluded frame(s) are selected as reference frames. In this manner, box 426 is able to use these reference frames to achieve temporal localization for object detection. In some embodiments, box 426 uses long-term RGB frames and/or long term pose data such as, for example, 2D pose data, from long-term buffer 406. However, 3D pose data and/or RGB frames and/or pose data from the short-term buffer 406 could be used to achieve approximate object localization according to some embodiments (either in addition to or instead of the long-term RGB frames and/or long term pose data).

Some embodiments include refinement of object location as implemented, for example, in block 428. Since the object was removed or put back in the previous action-state, all the pixels covering the object location change as a result of the action. These pixels can be discovered using change detection between the two reference frames selected in the previous step. The intersection of the change detection mask and the Approximate Bounding Box (ABB) gives a refined bounding box (refined BB) which tightly fits the object. The approximate and refined bounding boxes detected around objects (for example, objects which are picked up sequentially) are shown respectively in FIG. 6. This tight and refined bounding box can be used for object recognition in the edge processor or transferred to a cloud computing device, for example.

In some current usages of object recognition, low compute availability at the edge (or at the client) results in higher compute times, or backhaul network bandwidth availability results in delays in video data getting uploaded to the cloud for processing. According to some embodiments, since particular frames for object detection are identified and since the bounding box area within a frame is reduced, these compute and/or network bandwidth issues are eliminated. In some embodiments, for cloud based object recognition, network bandwidth and compute requirement for a cloud server can be dramatically reduced.

In some embodiments, short-term buffer 404, long-term buffer 406, action label decision 422, approximate object localization 424, reference frame selection 426 and/or refine object localization 428 are implemented using a processor. In some embodiments, instructions for that processor that may be used to implement any of the functions of 404, 406, 422, 424, 426 and/or 428 are stored on a machine readable medium. In some embodiments, that processor is deployed in an edge device (or client device), that can be connected to a camera (for example, in computing device 122 illustrated in FIG. 1). In some embodiments, that processor is deployed in a cloud device such as a cloud server, and/or in a combination of processors located in an edge device (or client device) and a cloud device. When these types of functions such as selecting particular image frames and identifying particular portions of those image frames are implemented, only an object's bounding box and occasional cropped image regions might be used by the edge computing device (or client computing device) and/or need to be sent to the cloud for object recognition rather than using the entire video.

Without using selection of image frames and identification of particular portions of those image frames, if an edge processor (or client processor) and a cloud device are being used, in order to perform object recognition, the entire video content might be sent over the network to the cloud for processing. However, according to some embodiments, by localizing one or more particular image frames, and localizing particular regions within those frames where the object is most likely to be present, the amount of bandwidth for transmission from the edge (or client) to the cloud is reduced significantly, resulting in tremendous bandwidth and processing savings.

Figure 5:
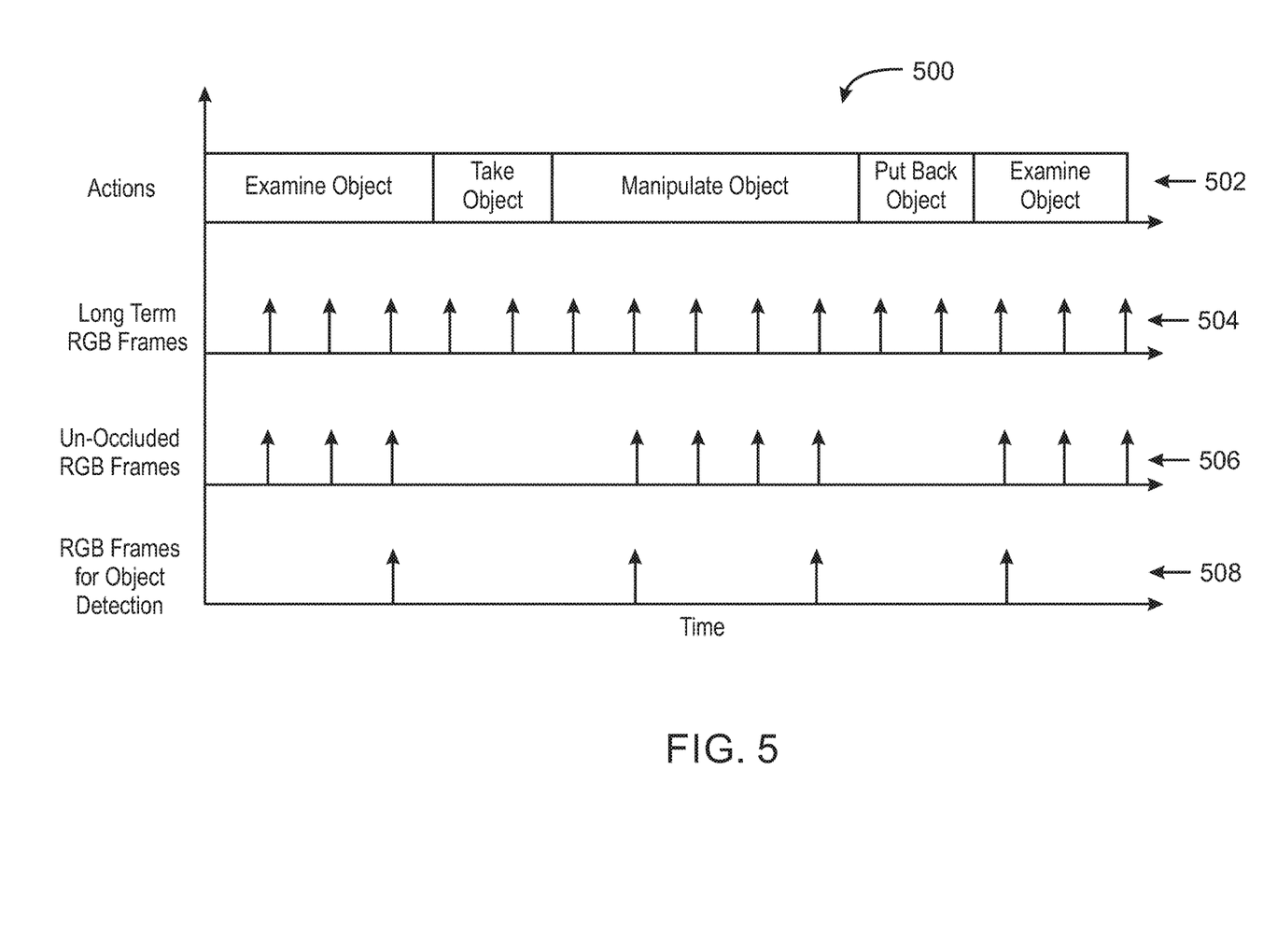
FIG. 5 illustrates a timing diagram showing reference-frame selection logic for object detection.

FIG. 5 illustrates a timing diagram 500 showing reference-frame selection logic for object detection (for example, as implemented by block 426 in FIG. 4). Timing diagram 500 includes an action timing diagram 502, a long term RGB frames timing diagram 504, an un-occluded RGB frames timing diagram 506, and an RGB frames for object detection timing diagram 508. If the action state in action diagram 502 is "take object" or "put back object", which respectively illustrate a time period during which a user is taking an object or putting an object back, the 2D and 3D pose (human joint positions) are cached for further processing. If the action state in action diagram 502 is "examine object", which illustrates a time period during which the user is examining one or more objects, and it was preceded by a "taking object" or "putting back object" action, then the cached poses during the previous action-state are used for approximate object localization. Similarly, if the action state in action diagram 502 is "manipulate object", which illustrates a time period during which the user is manipulating one or more objects, and it was preceded by a "taking object" or "putting back object" action, then the cached poses during the previous action-state are used for approximate object localization.

In some embodiments, action diagram 502 illustrates a set of actions (or tasks) that a human user performs in front of a shelf, an operating room table, a cooking counter, an inventory control table, a desk, etc. The user picks up one or more items from the shelf, table, counter, desk, etc. and performs particular tasks with the items. First the user examines the object (for example, the user determines where the object is located). Then the user takes the object and manipulates the object (for example, the user picks up a knife and performs some task with the knife such as performing surgery or cutting ingredients as part of a cooking task). The user then puts the object back (either where it was previously or in a different location). It is noted that in some embodiments, the user may not put the object back, in which case the "put back object" state may be missing. Then the user examines another object, and similar actions occur for the next object.

Long term RGB image frames are captured every so often (for example, once every 5 seconds) as illustrated by the arrows in long term RBG frames timing diagram 504. Certain of the long term RGB image frames 504 are then qualified as un-occluded (or unblocked) RGB image frames shown by the arrows in timing diagram 506. For example, these un-occluded frames qualified as un-occluded in timing diagram 506 are qualified as image frames where the object is not occluded (blocked) by, for example, a portion of the user's body such as one or more of the user's hands. Typically, image frames occurring during "take object" and "put back object" time frames in action diagram 502 are not good image frames to be used for object recognition (that is, they are not good image frames because the object is blocked). Such frames are not good frames to pass on to an object recognition engine. Therefore, only certain frames are good frames that are advantageous to be passed on to the object recognition engine. Out of the qualified frames in timing diagram 506, certain frames are qualified as the best frames on which to run object recognition (for example, image frames immediately before and/or after "take object" and "put back object" actions may be qualified as the best frames according to some embodiments). These best frames are shown by arrows in the RGB frames for object detection timing diagram 508. In some embodiments, image frames immediately before "take object" and image frames immediately after "put back object" may be used as the best frames for object recognition identified by arrows in timing diagram 508.

Using reference frame selection according to some embodiments, since in a particular image frame the hands (or other body part) of the user are sometimes partially or fully occluding (or blocking) the line of sight of the camera to the object while touching it, the frame may not be a suitable frame for object recognition. In order to perform interacted object detection and recognition on a frame, the ABB region has to be un-occluded (or unblocked) by human body parts in the considered image frame. Such frames can be selected from the Long-Term RGB frames in which ABB does not intersect the human body silhouette. According to some embodiments, the human body silhouette in each frame can be inferred using foreground extraction or silhouette synthesis around the 2D skeletal joints.

Reference frame selection logic is illustrated through the timing diagram in FIG. 5. The sequential actions of an operator are mentioned in the top row action diagram 502. In some embodiments, the times at which the long term RGB and pose buffers are captured are shown by arrows in the second row long term RGB frame diagram 504. Based on the non-intersection of the ABB with a human body silhouette in these image frames, some frames are qualified as "un-occluded frames" as shown by arrows in the third row un-occluded RGB frame diagram 506. For every "take object" or "put back object" action, one (or more) past and one (or more) future un-occluded frames are selected as reference frames as shown for example, by arrows in the last row frames for object detection diagram 508 of FIG. 5. These reference frames achieve temporal localization for object detection.

Figure 6A:
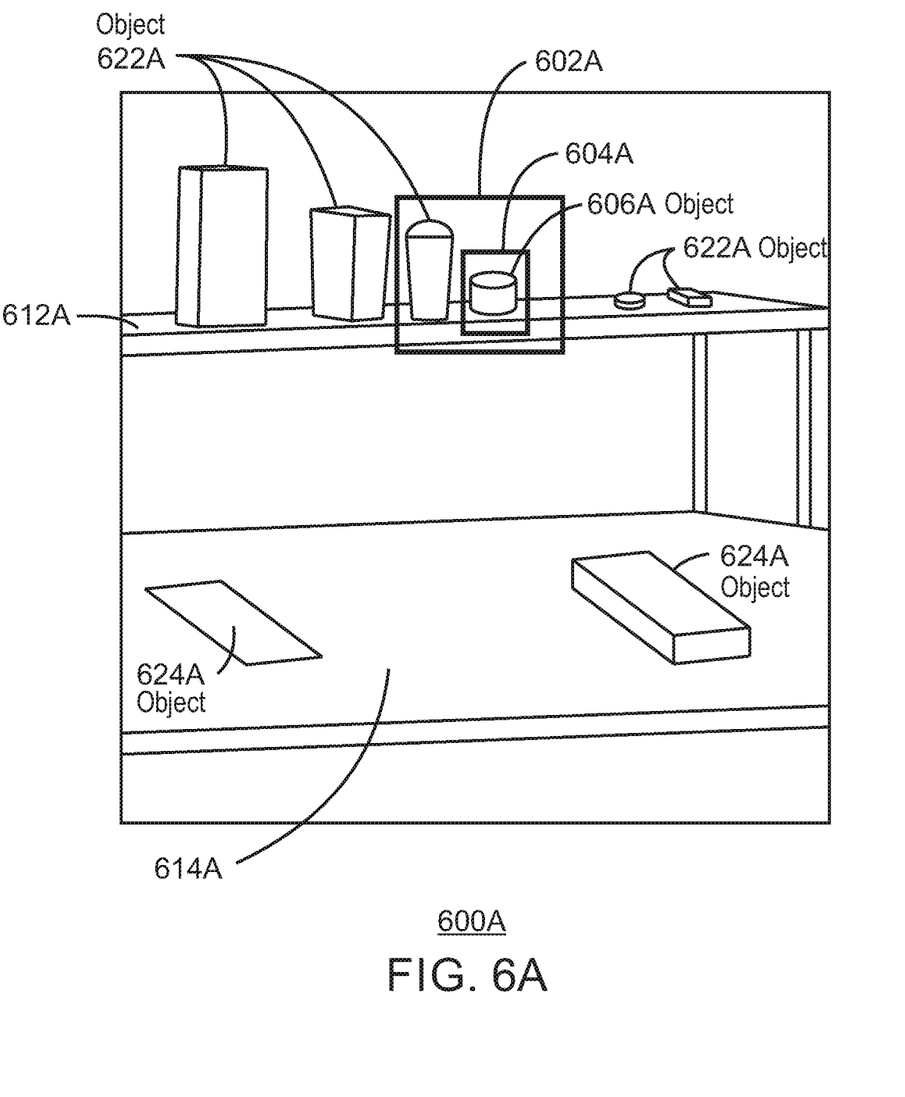
FIG. 6(a), FIG. 6(b), and FIG. 6(c), illustrates bounding boxes around products picked by a human.
Figure 6B:
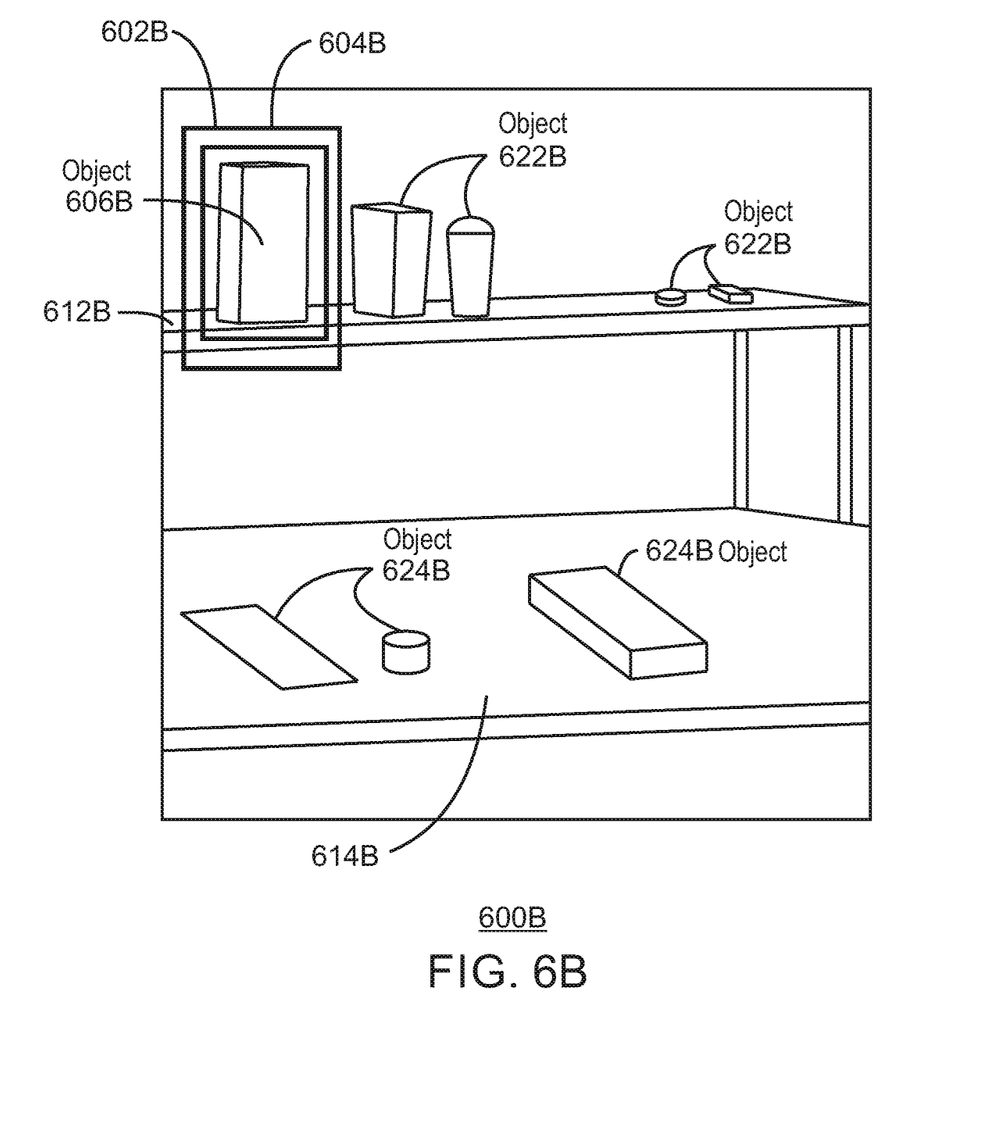
Figure 6C:
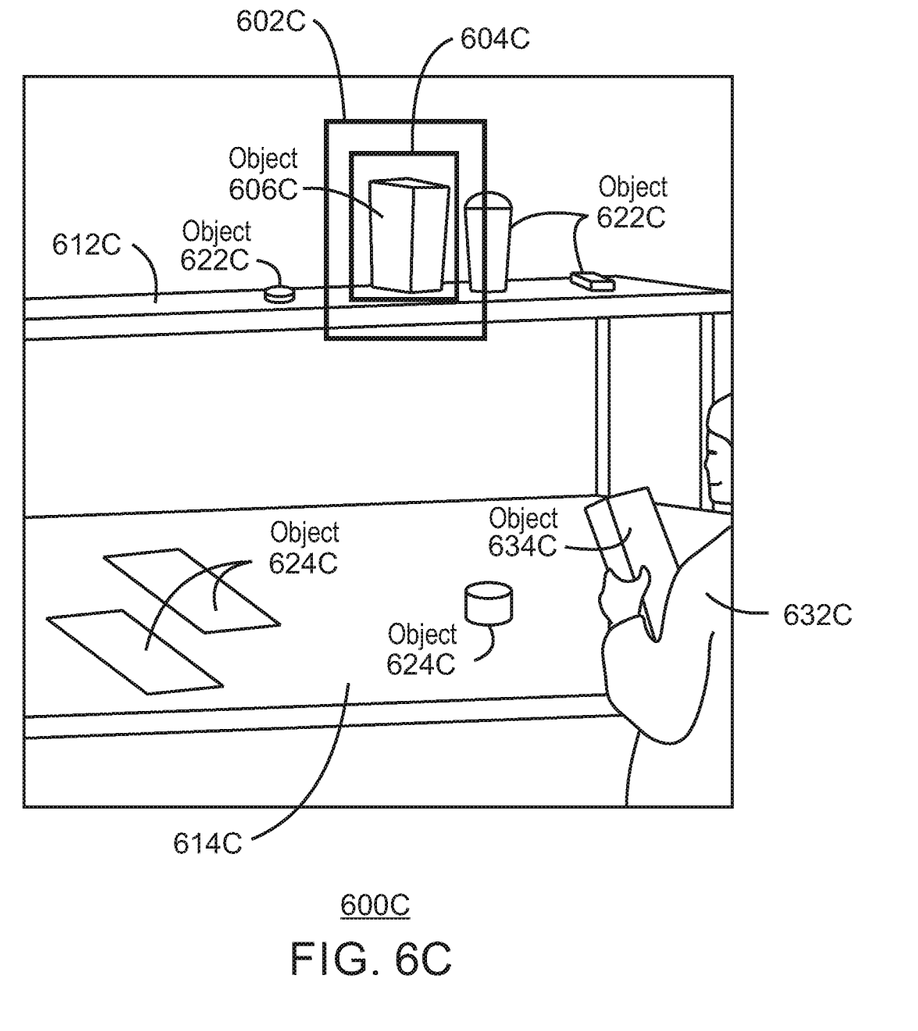

FIG. 6, which includes FIG. 6(*a*), FIG. 6(*b*), and FIG. 6(*c*), illustrates refinement of object location. More specifically, FIG. 6 illustrates bounding boxes around products picked by a human according to some embodiments. These bounding boxes include, in some embodiments, approximate bounding boxes (ABBs) and refined Bounding Boxes (BBs). FIG. 6(*a*) illustrates an approximate bounding box (ABB) 602A around an object 606A and a refined bounding box (BB) 604A around the object 606A. FIG. 6(*b*) illustrates an approximate bounding box (ABB) 602B around an object 606B and a refined bounding box (BB) 604B around the object 606B. FIG. 6(*c*) illustrates an approximate bounding box (ABB) 602C around an object 606C and a refined bounding box (BB) 604C around the object 606C.

Each of FIGS. 6(*a*), 6(*b*) and 6(*c*) illustrate additional objects, and FIG. 6(*c*) illustrates one of the additional objects in the hand of a user. In FIG. 6(*a*), shelf 612A and desk 614A have objects thereon. Objects 622A and 606A are on shelf 612A and objects 624A are on desk 614A. In FIG. 6(*b*), shelf 612B and desk 614B have objects thereon. Objects 622B and 606B are on shelf 612B and objects 624B are on desk 614B. In FIG. 6(*c*), shelf 612C and desk 614C have objects thereon. Objects 622C and 606C are on shelf 612C and objects 624C are on desk 614C. Additionally, a user 632C in FIG. 6(*c*) is holding an object 634C in their hand.

In some embodiments of FIG. 6, since the object 606A, 606B, and/or 606C was removed or put back in a previous action-state, all the pixels covering the object location change as a result of the action. These pixels can be discovered using change detection between the two reference frames selected in the previous step. The intersection of the change detection mask and the ABB 602A, 602B, and/or 602C gives a refined bounding box 604A, 604B, and/or 604C which tightly fits the object. These approximate and refined bounding boxes illustrated in FIG. 6 can be detected around certain objects which are picked up sequentially by a user. The tight and refined bounding box 604A, 604B and/or 604C can be used for object recognition in an edge (or client) processor, and/or transferred to a cloud computing device.

Some embodiments relate to reducing compute complexity for human interacted object (HIO) recognition. Some embodiments relate to action-based identification of the most probable set of image frames (target frames or target image frames) at which the interacted object is un-occluded for more accurate recognition. Some embodiments relate to estimating the object location in the target frames using the maximum displacements of wrists from the hip during object fetch\release. Some embodiments relate to generalization to a wider gamut of HOIs (human object interactions) in which the objects are fetched and manipulated one after another, where the approach is agnostic to specific object manipulations, objects and their dependencies. Some embodiments relate to real-time object localization, as the system decouples action and object recognitions and does not use any complex iterative message passing networks for jointly recognizing them.

Some embodiments include message exchange between software components. For example, an object detection system might have multiple stages in its pipeline, with images and regions of interest provided as output and input into different stages. In some embodiments, the timing of those inputs is correlated predictably in time with human actions. In some embodiments, the inputs include region information such as bounding box coordinates. Some embodiments use API calls to libraries (for example, such as the Kinect for Windows SDK) that are correlated with other behaviors of the system. In some embodiments, there is a relationship between human action recognition and object recognition.

In some embodiments, action and interacted objected recognition solutions are deployed for retail, health care, kitchen, and/or manufacturing domains. In some embodiments, cloud based object recognition is employed, which can dramatically reduce the network bandwidth and compute requirements for the cloud server. This is possible, for example, according to some embodiments, when included in an edge device connected to a camera in a manner such that only the object's bounding box and occasional cropped image regions need to be sent to the cloud for object-recognition rather than needing to send the video itself. In some embodiments, a camera (for example, an Intel® Real sense camera) is used with pose-tracking capabilities. In some embodiments, such a camera is deployed near areas of inventory storage in a manner such that human actions as well as the interacted objects can be efficiently recognized.

In some embodiments, target image frames are located and human interacted objects in a smart task space are detected. Some embodiments relate to determining the frame to use for object recognition. In some embodiments, a determination is made as to where in an image frame to start searching for objects. Some embodiments relate to action recognition, action segmentation, poise tracking and/or object detection.

In some embodiments, high level interactions such as "taking an object" and "replacing an object" are recognized using sequences of poses (for example, 3D poses) modelled using HMMs (Hidden Markov Models). This can help in temporal localization (for example, obtaining a set of target image frames for object recognition).

In some embodiments, while a user is picking or placing an object, the joint location (for example, 2D joint location) of the wrist of the user in the image frame (for example, touch frame) is used. In some embodiment, this is the point at which the wrist is displaced a maximum amount from the hip of the user, providing an approximate spatial location of the object (that is, an approximate bounding box or ABB).

In some embodiments, image frame differencing between two long-term frames captured before and after the touch frame provides a change detection mask containing the object and human initiated changes on the object. According to some embodiments, an intersection between the change mask and the approximate bounding box (ABB) provides a refined bounding box (refined BB) for the object.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

In some examples, a system to recognize an object includes a processor to determine an approximate location of the object in response to identifying an active hand of a person in an image frame received from a camera, to select an image frame in which the object is not occluded (that is, blocked) by the person, and to detect a change in location of the object.

In some examples, a method for recognizing an object includes determining an approximate location of the object in response to identifying an active hand of a person in an image frame received from a camera, selecting an image frame in which the object is not occluded (that is, blocked) by the person, and detecting a change in location of the object.

In some examples, at least one computer-readable medium includes instructions to direct a processor to determine an approximate location of the object in response to identifying an active hand of a person in an image frame received from a camera, select an image frame in which the object is not occluded (that is, blocked) by the person, and detect a change in location of the object.

EXAMPLES

In EXAMPLE 1, a system for recognizing an object includes a processor to select from a plurality of image frames an image frame in which a view of the object is not blocked, and to estimate a location of the object in the selected image frame.

In EXAMPLE 2, the system of example 1, the processor to select from the plurality of image frames a second image frame in which the view of the object is not blocked, and to estimate a location of the object in the second image frame.

In EXAMPLE 3, the system of example 2, the processor to detect a change in location of the object between the selected image frame and the second image frame, and to refine the estimated location of the object in response to the estimated location of the object in the selected frame and in response to the detected change of location.

In EXAMPLE 4, the system of any of examples 1-3, the processor to select the image frame in response to image frame data and pose data.

In EXAMPLE 5, the system of any of examples 1-4, the processor to select the image frame in response to long-term image frame data and long-term pose data.

In EXAMPLE 6, the system of any of examples 1-5, the processor to estimate the location of the object in response to pose data.

In EXAMPLE 7, the system of any of examples 1-6, the processor to estimate the location of the object in response to short-term pose data.

In EXAMPLE 8, the system of any of examples 1-7, the processor to select the image frame in response to a state of interaction between a person and the object.

In EXAMPLE 9, the system of any of examples 1-8, the processor to select the image frame based on a timing before or after a user picks up or sets back down the object.

In EXAMPLE 10, the system of any of examples 1-9, the processor to estimate the location of the object in the image frame based on a displacement between a wrist and a hip of a user near a fetch time or a release time of the object by the user.

In EXAMPLE 11, a method for recognizing an object including selecting from a plurality of image frames an image frame in which a view of the object is not blocked, and estimating a location of the object in the selected image frame.

In EXAMPLE 12, the method of example 11, including selecting from the plurality of image frames a second image frame in which the view of the object is not blocked, and estimating a location of the object in the second image frame.

In EXAMPLE 13, the method of example 12, including detecting a change in location of the object between the selected image frame and the second image frame, and refining the estimated location of the object in response to the estimated location of the object in the selected frame and in response to the detected change of location.

In EXAMPLE 14, the method of any of examples 11-13, including selecting the image frame in response to image frame data and pose data.

In EXAMPLE 15, the method of any of examples 11-14 including selecting the image frame in response to long-term image frame data and long-term pose data.

In EXAMPLE 16, the method of any of examples 11-15, including estimating the location of the object in response to pose data.

In EXAMPLE 17, the method of any of examples 11-16, including estimating the location of the object in response to short-term pose data.

In EXAMPLE 18, the method of any of examples 11-17, including selecting the image frame in response to a state of interaction between a person and the object.

In EXAMPLE 19, the method of any of examples 11-18, including selecting the image frame based on a timing before or after a user picks up or sets back down the object.

In EXAMPLE 20, the method of any of examples 11-19, including estimating the location of the object in the image frame based on a displacement between a wrist and a hip of a user near a fetch time or a release time of the object by the user.

In EXAMPLE 21, at least one computer-readable medium for recognizing an object, including instructions to direct a processor to select from a plurality of image frames an image frame in which a view of the object is not blocked, and to estimate a location of the object in the selected image frame.

In EXAMPLE 22, the at least one computer-readable medium of example 21, the instructions to direct the processor to select from the plurality of image frames a second image frame in which the view of the object is not blocked, and estimate a location of the object in the second image frame.

In EXAMPLE 23, the at least one computer-readable medium of example 22, the instructions to direct the processor to detect a change in location of the object between the selected image frame and the second image frame, and to refine the estimated location of the object in response to the estimated location of the object in the selected frame and in response to the detected change of location.

In EXAMPLE 24, the at least one computer-readable medium of any of examples 21-23, the instructions to direct the processor to select the image frame in response to image frame data and pose data.

In EXAMPLE 25, the at least one computer-readable medium of any of examples 21-24, the instructions to direct the processor to select the image frame in response to long-term image frame data and long-term pose data.

In EXAMPLE 26, the at least one computer-readable medium of any of examples 21-25, the instructions to direct the processor to estimate the location of the object in response to pose data.

In EXAMPLE 27, the at least one computer-readable medium of any of examples 21-26, the instructions to direct the processor to estimate the location of the object in response to short-term pose data.

In EXAMPLE 28, the at least one computer-readable medium of any of examples 21-27, the instructions to direct the processor to select the image frame in response to a state of interaction between a person and the object.

In EXAMPLE 29, the at least one computer-readable medium of any of examples 21-28, the instructions to direct the processor to select the image frame based on a timing before or after a user picks up or sets back down the object.

In EXAMPLE 30, the at least one computer-readable medium of any of examples 21-29, the instructions to direct the processor to estimate the location of the object in the image frame based on a displacement between a wrist and a hip of a user near a fetch time or a release time of the object by the user.

In EXAMPLE 31, a system for recognizing an object, including means for selecting from a plurality of image frames an image frame in which a view of the object is not blocked, and means for estimating a location of the object in the selected image frame.

In EXAMPLE 32, the system of example 31, including means for selecting from the plurality of image frames a second image frame in which the view of the object is not blocked, and means for estimating a location of the object in the second image frame.

In EXAMPLE 33, the system of example 32, including means for detecting a change in location of the object between the selected image frame and the second image frame, and means for refining the estimated location of the object in response to the estimated location of the object in the selected frame and in response to the detected change of location.

In EXAMPLE 34, the system of any of examples 31-33, including means for selecting the image frame in response to image frame data and pose data.

In EXAMPLE 35, the system of any of examples 31-34, including means for selecting the image frame in response to long-term image frame data and long-term pose data.

In EXAMPLE 36, the system of any of examples 31-35, including means for estimating the location of the object in response to pose data.

In EXAMPLE 37, the system of any of examples 31-36, including means for estimating the location of the object in response to short-term pose data.

In EXAMPLE 38, the system of any of examples 31-37, including means for selecting the image frame in response to a state of interaction between a person and the object.

In EXAMPLE 39, the system of any of examples 31-38, including means for selecting the image frame based on a timing before or after a user picks up or sets back down the object.

In EXAMPLE 40, the system of any of examples 31-39, including means for estimating the location of the object in the image frame based on a displacement between a wrist and a hip of a user near a fetch time or a release time of the object by the user.

In EXAMPLE 41, a machine readable medium including code, when executed, to cause a machine to perform the method of any one of examples 11-20.

In EXAMPLE 42, an apparatus including means to perform a method as implemented in any preceding example.

In EXAMPLE 43, machine readable storage including machine readable instructions, when executed, to implement a method or realize an apparatus as implemented in any preceding example.

Although an example embodiment of the disclosed subject matter is described with reference to the drawings, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A system for recognizing an object comprising:
    a processor to:
        select, from a plurality of image frames captured by a camera, an image frame in which a line of sight between the camera and the object is not blocked, wherein the selected image frame includes an image of a user interacting with the object;
        estimate a location of the object in the selected image frame based on a displacement between a wrist and a hip of the user interacting with the object near a fetch time or a release time of the object by the user; and
        identify an approximate spatial location of the object based on the location estimate.

2. The system of claim 1, the processor to select the image frame in response to image frame data and pose data.

3. The system of claim 1, the processor to select the image frame in response to long-term image frame data and long-term pose data.

4. The system of claim 1, the processor to estimate the location of the object in response to pose data.

5. The system of claim 1, the processor to estimate the location of the object in response to short-term pose data.

6. The system of claim 1, wherein the user is a person.

7. The system of claim 1, the processor to detect an interaction of the user with the object based on a displacement between an elbow joint from a hip of the user.

8. The system of claim 1, wherein the image of the user interacting with the object includes the user interacting with the object in at least one of a hospital, a surgical operating room, a kitchen location, a manufacturing location, or a shopping location.

9. The system of claim 1, the processor to select from the plurality of image frames a second image frame in which the line of sight between the camera and the object is not blocked, and to estimate a location of the object in the second image frame.

10. The system of claim 9, the processor to detect a change in location of the object between the selected image frame and the second image frame, and to refine the estimated location of the object in response to the estimated location of the object in the selected frame and in response to the detected change of location.

11. The system of claim 1, the processor to select the image frame in response to a state of interaction between a person and the object.

12. The system of claim 11, the processor to select the image frame based on a timing before or after the user picks up or sets back down the object.

13. A method for recognizing an object comprising:
    selecting, from a plurality of image frames captured by a camera, an image frame in which a line of sight between the camera and the object is not blocked, wherein the selected image frame includes an image of a user interacting with the object;
    estimating a location of the object in the selected image frame based on a displacement between a wrist and a hip of the user interacting with the object near a fetch time or a release time of the object by the user; and
    identifying an approximate spatial location of the object based on the location estimate.

14. The method of claim 13, comprising selecting the image frame in response to image frame data and pose data.

15. The method of claim 13, comprising estimating the location of the object in response to pose data.

16. The method of claim 13, wherein the user is a person.

17. The method of claim 13, comprising detecting an interaction of the user with the object based on a displacement between an elbow joint from a hip of the user.

18. The method of claim 13, wherein the image of the user interacting with the object includes the user interacting with the object in at least one of a hospital, a surgical operating room, a kitchen location, a manufacturing location, or a shopping location.

19. The method of claim 13, comprising selecting from the plurality of image frames a second image frame in which the line of sight between the camera and the object is not blocked, and estimating a location of the object in the second image frame.

20. The method of claim 19, comprising detecting a change in location of the object between the selected image frame and the second image frame, and refining the estimated location of the object in response to the estimated location of the object in the selected frame and in response to the detected change of location.

21. The method of claim 13, comprising selecting the image frame in response to a state of interaction between a person and the object.

22. The method of claim 21, comprising selecting the image frame based on a timing before or after the user picks up or sets back down the object.

23. At least one non-transitory computer-readable medium for recognizing an object, comprising instructions to direct a processor to:
  select, from a plurality of image frames captured by a camera, an image frame in which a line of sight between the camera and the object is not blocked, wherein the selected image frame includes an image of a user interacting with the object;
  estimate a location of the object in the selected image frame based on a displacement between a wrist and a hip of the user interacting with the object near a fetch time or a release time of the object by the user; and
  identify an approximate spatial location of the object based on the location estimate.

24. The at least one computer-readable medium of claim 23, the instructions to direct the processor to select the image frame in response to image frame data and pose data.

25. The at least one computer-readable medium of claim 23, the instructions to direct the processor to estimate the location of the object in response to pose data.

26. The at least one computer-readable medium of claim 23, wherein the user is a person.

27. The at least one computer-readable medium of claim 23, the instructions to direct the processor to detect an interaction of the user with the object based on a displacement between an elbow joint from a hip of the user.

28. The at least one computer-readable medium of claim 23, wherein the image of the user interacting with the object includes the user interacting with the object in at least one of a hospital, a surgical operating room, a kitchen location, a manufacturing location, or a shopping location.

29. The at least one computer-readable medium of claim 23, the instructions to direct the processor to:
  select from the plurality of image frames a second image frame in which the line of sight between the camera and the object is not blocked; and
  estimate a location of the object in the second image frame.

30. The at least one computer-readable medium of claim 29, the instructions to direct the processor to:
  detect a change in location of the object between the selected image frame and the second image frame; and
  refine the estimated location of the object in response to the estimated location of the object in the selected frame and in response to the detected change of location.

31. The at least one computer-readable medium of claim 23, the instructions to direct the processor to select the image frame in response to a state of interaction between a person and the object.

32. The at least one computer-readable medium of claim 31, the instructions to direct the processor to select the image frame based on a timing before or after the user picks up or sets back down the object.

* * * * *